United States Patent
Shu et al.

(10) Patent No.: US 10,647,869 B2
(45) Date of Patent: May 12, 2020

(54) PEELABLE COATING COMPOSITION AND PROCESS OF MAKING THE SAME

(71) Applicants: Dow Global Technologies LLC, Midland, MI (US); Rohm and Haas Company, Collegeville, PA (US)

(72) Inventors: Shujun Shu, Shanghai (CN); Yurun Yang, Shanghai (CN); Yaobang Li, Shanghai (CN); Yan Guo, Shanghai (CN); Mingqu Yu, Shanghai (CN); Baoqing Zheng, Shanghai (CN)

(73) Assignees: Dow Global Technologies LLC, Midland, MI (US); Rohm and Haas Company, Philadelphia, PA (US)

( * ) Notice: Subject to any disclaimer, the term of this patent is extended or adjusted under 35 U.S.C. 154(b) by 171 days.

(21) Appl. No.: 15/749,239

(22) PCT Filed: Aug. 18, 2015

(86) PCT No.: PCT/CN2015/087308
§ 371 (c)(1),
(2) Date: Jan. 31, 2018

(87) PCT Pub. No.: WO2017/028196
PCT Pub. Date: Feb. 23, 2017

(65) Prior Publication Data
US 2018/0223123 A1    Aug. 9, 2018

(51) Int. Cl.
| | | |
|---|---|---|
| C09D 133/02 | (2006.01) |
| C09D 5/20 | (2006.01) |
| C08K 5/07 | (2006.01) |
| C08K 5/17 | (2006.01) |
| C08K 5/20 | (2006.01) |
| C08F 2/20 | (2006.01) |
| C08F 2/22 | (2006.01) |
| C08F 2/30 | (2006.01) |
| C09D 133/12 | (2006.01) |
| C08K 5/3445 | (2006.01) |
| C08K 5/3475 | (2006.01) |
| C08K 5/3492 | (2006.01) |
| C08L 1/26 | (2006.01) |

(52) U.S. Cl.
CPC .............. *C09D 133/02* (2013.01); *C08F 2/20* (2013.01); *C08F 2/22* (2013.01); *C08F 2/30* (2013.01); *C08K 5/07* (2013.01); *C08K 5/175* (2013.01); *C08K 5/20* (2013.01); *C08K 5/3445* (2013.01); *C08K 5/3475* (2013.01); *C08K 5/3492* (2013.01); *C09D 5/20* (2013.01); *C09D 133/12* (2013.01); *C08L 1/26* (2013.01); *C08L 2207/53* (2013.01)

(58) Field of Classification Search
CPC .......... C09D 133/02; C09D 5/20; C09D 5/07; C09D 5/17; C08K 5/20
USPC ....................................................... 524/522
See application file for complete search history.

(56) References Cited

U.S. PATENT DOCUMENTS

| | | |
|---|---|---|
| 4,427,836 A | 1/1984 | Kowalski et al. |
| 4,468,498 A | 8/1984 | Kowalski et al. |
| 4,469,825 A | 9/1984 | Kowalski et al. |
| 4,594,363 A | 6/1986 | Blankenship et al. |
| 4,677,003 A | 6/1987 | Redlich et al. |
| 4,910,229 A | 3/1990 | Okubo |
| 4,920,160 A | 4/1990 | Chip et al. |
| 4,970,241 A | 11/1990 | Kowalski et al. |
| 5,157,084 A | 10/1992 | Lee et al. |
| 5,494,971 A | 2/1996 | Blankenship |
| 5,510,422 A | 4/1996 | Blankenship et al. |
| 6,139,961 A | 10/2000 | Blankenship et al. |
| 6,555,615 B2 | 4/2003 | Van Rheenen |
| 6,620,890 B1 | 9/2003 | Yamashita et al. |
| 6,632,531 B2 | 10/2003 | Blankenship |
| 6,831,126 B2 | 12/2004 | Gertzmann et al. |
| 6,896,905 B2 | 5/2005 | Blankenship et al. |
| 8,470,910 B2 | 6/2013 | Fasano et al. |
| 2002/0165108 A1 | 11/2002 | van Rossum et al. |
| 2010/0183901 A1 | 7/2010 | Van Ginneken et al. |
| 2012/0015016 A1 | 1/2012 | Galdi et al. |
| 2014/0087156 A1* | 3/2014 | Sarkis ............... C09D 5/02 428/212 |

FOREIGN PATENT DOCUMENTS

| | | |
|---|---|---|
| EP | 267726 A2 | 5/1988 |
| EP | 331421 A2 | 9/1989 |
| EP | 0915108 A1 | 5/1999 |
| EP | 1642940 A2 | 4/2006 |
| WO | 03002674 A1 | 1/2003 |
| WO | 2008063411 A2 | 5/2008 |
| WO | 2014203913 A1 | 12/2014 |

OTHER PUBLICATIONS

Cowell, R. D.; Bluestein, B. R.; Hilton, C. L.; Amphoteric Surfactants, Surfactant Series, vol. 12, Chapter 5, Marcel Dekker, NY 1982.

* cited by examiner

*Primary Examiner* — Deve V Hall
(74) *Attorney, Agent, or Firm* — Karl E. Stauss; Cantor Colburn LLP

(57) ABSTRACT

A peelable coating composition capable of providing coating films with good peelability particularly after UV exposure and desirable mechanical properties.

13 Claims, No Drawings

PEELABLE COATING COMPOSITION AND PROCESS OF MAKING THE SAME

CROSS REFERENCE TO RELATED APPLICATION

This application is a National Stage application of PCT/CN2015/087308, filed Aug. 18, 2015, which is incorporated by reference in its entirety herein.

FIELD OF THE INVENTION

The present invention relates to a peelable coating composition and a process of making the same.

INTRODUCTION

Peelable coatings (also referred to removable protective coatings), for a period of time, provide protection to surfaces against deterioration due to adverse environmental conditions, for example, contact with sharp objects, with objects bearing transferable color bodies, and with acid rain and ultraviolet (UV) radiation. Although the time interval during which the coating must provide protection may be as long as months, or even years, it is further desirable that such temporary coatings be removable when the level of protection they provide is no longer needed.

The need for removable protective coatings exists, for example, during the production, storage, and distribution of vehicles, ships, appliances, computers, furniture, sporting equipment, and the parts from which they are manufactured, as well as building materials When the time comes to reveal the still pristine surface, it is highly desirable to be able to quickly and smoothly remove the entire coating to maintain a "just off the assembly line" appearance to the coated ships, leaving no residue, causing no damage to under layers, without recourse to labor intensive processes, use of any additional materials (e.g., solvents, acids, bases, and aqueous detergents), or generation of waste streams.

WO2008/063411A2 discloses a peelable protective coating composition for protecting exterior surfaces of automobiles and other products. The coating composition comprises an aqueous mixture or solution comprising a polyvinyl butyral film former, and an extender, wherein the mixture or solution does not include a polyurethane. However, the obtained peelable coating after UV exposure is not evaluated.

Therefore, it is desirable to provide a coating composition that provides protection of substrates from, for example, the deleterious effects of UV exposure. In addition, coating films formed from such coating composition is easily removed as a single sheet, leaving no residue.

SUMMARY OF THE INVENTION

The present invention relates to a peelable coating composition that can be applied to the surface of a substrate to form a coating that provides protection to that surface against a variety of adverse environmental conditions, for example, UV exposure, yet is easily removable, preferably as a continuous sheet. The present invention further relates to a method of preparing a peelable coating from the coating composition.

In a first aspect, the present invention is a peelable coating composition, comprising:

(a) an aqueous dispersion of an acrylic (co)polymer, wherein the aqueous dispersion comprises a water-soluble nonionic cellulose ether stabilizer, and wherein the acrylic (co)polymer is substantially free of, as polymerized units, a monoethylenically unsaturated monomer containing acid-functionality;

(b) an amphoteric surfactant having an isoelectric point at pH 3 to pH 8;

(c) a dispersion of core-shell polymeric particles present in an amount of from 1% to 15% by solids weight, based on the total solids weight of the coating composition; wherein the polymeric particles comprise, when dry, at least one void; and (d) a light absorber, a light stabilizer, or mixtures thereof.

In a second aspect, the present invention is a peelable coating composition comprising:

(a) an aqueous dispersion of an acrylic (co)polymer present in an amount of from 60% to 95% by solids weight, based on the total solids weight of the coating composition; wherein the dispersion comprises a water-soluble nonionic cellulose ether stabilizer, and wherein the acrylic (co)polymer is substantially free of polymerized units of a monoethylenically unsaturated monomer containing acid-functionality;

(b) an amphoteric surfactant having an isoelectric point at pH 3 to pH 8;

(c) a dispersion of core-shell polymeric particles present in an amount of from 1% to 15% by solids weight, based on the total solids weight of the coating composition; wherein the polymeric particles comprise, when dry, at least one void; and (d) from 0.1% to 10% by weight, based on the total solids weight of the coating composition, of a light absorber, a light stabilizer, or mixtures thereof.

In a third aspect, the present invention is a method of preparing a peelable coating. The method comprises:

(1) applying to the surface of a substrate a peelable coating composition of the first or second aspect, and (2) drying, or allowing to dry, the coating composition.

DETAILED DESCRIPTION OF THE INVENTION

The coating composition of the present invention comprises an aqueous dispersion of an acrylic (co)polymer. The acrylic (co)polymer herein refers to a polymer or copolymer comprising, as polymerized units, one or more acrylic or methacrylic monomers. The acrylic (co)polymer may be used as a binder. "Acrylic" in the present invention includes (meth)acrylic acid, (meth)alkyl acrylate, (meth)acrylamide, (meth)acrylonitrile and their modified forms such as (meth)hydroxyalkyl acrylate. Throughout this document, the word fragment "(meth)acryl" refers to both "methacryl" and "acryl". For example, (meth)acrylic acid refers to both methacrylic acid and acrylic acid, and methyl (meth)acrylate refers to both methyl methacrylate and methyl acrylate.

The acrylic (co)polymer useful in the present invention may comprise, as polymerized units, one or more nonionic monoethylenically unsaturated monomers. Nonionic monomers refer to monomers that do not bear an ionic charge between pH=1-14. Examples of suitable nonionic monoethylenically unsaturated monomers include (meth)alkyl or alkenyl esters of (meth)acrylic acid, such as methyl(meth)acrylate, ethyl(meth)acrylate, butyl(meth)acrylate, 2-ethylhexyl(meth)acrylate, hydroxyethyl(meth)acrylate, hydroxypropyl(meth)acrylate, benzyl(meth)acrylate, lauryl(meth)acrylate, oleyl(meth)acrylate, palmityl (meth)acrylate, stearyl(meth)acrylate, nonyl(meth)acrylate, decyl(meth)acrylate and the like; (meth)acrylonitrile; acrylamide; or mixtures thereof. Preferably, butyl acrylate is used as the nonionic monoethylenically unsaturated monomer. Other suitable nonionic monoethylenically unsaturated monomers may be further added, for example, styrene and substituted styrene such as .alpha.-methyl styrene, p-methyl styrene, t-butyl styrene, vinyltoluene; ethylene, propylene, 1-decene; or other vinyl monomers such as vinyl acetate, vinyl butyrate, vinyl versatate and other vinyl esters, vinyl chloride, vinylidene chloride or mixtures thereof.

The acrylic (co)polymer useful in the present invention may further comprise one or more multiethylenically unsaturated monomers. Examples of suitable multiethylenically unsaturated monomers include butadiene, allyl(meth)acrylate, divinyl benzene, or mixtures thereof. The multiethylenically unsaturated monomers may be present, as polymerized units, from 0 to 5% by weight, from 0.1% to 3% by weight, or from 0.5% to 1.5% by weight, based on the solids weight of the acrylic (co)polymer.

In one embodiment, the acrylic (co)polymer useful in the present invention is substantially free of, as polymerized units, monoethylenically unsaturated monomers containing acid-functionality. "Substantially free" means that the monoethylenically unsaturated monomers containing acid-functionality are present, as polymerized units, from 0 to 1% by weight, preferably less than 0.5% by weight, and more preferably less than 0.1% by weight, based on the solids weight of the acrylic (co)polymer. The monoethylenically unsaturated monomers containing acid-functionality may include monomers containing at least one carboxylic acid group including, for example, acrylic acid; methacrylic acid; acryloxypropionic acid; (meth)acryloxypropionic acid; itaconic acid; aconitic acid; maleic acid or anhydride; fumaric acid; crotonic acid; monomethyl maleate; monomethyl fumarate; monobutyl fumarate; monomethyl itaconate; phosphorus acid monomers such as dihydrogen phosphate monomers including 2-phosphoethyl (meth)acrylate, vinyl phosphonic acid, and allyl phosphonic acid; 2-acrylamido-2-methyl-1-propanesulfonic acid; sodium salt of 2-acrylamido-2-methyl-1-propanesulfonic acid; ammonium salt of 2-acrylamido-2-methyl-1-propane sulfonic acid; sodium vinyl sulfonate; sodium salt of allyl ether sulfonate; or mixtures thereof.

In some embodiments, the acrylic (co)polymer useful in the present invention may be selected from an acrylic polymer, a styrene-acrylic copolymer, a vinylacetate-acrylic copolymer, or mixtures thereof.

In one preferred embodiment, the acrylic (co)polymer comprises, as polymerized units, from 60% to 100% by weight, preferably from 70% to 100% by weight, of nonionic monoethylenically unsaturated monomers selected from the (meth) alkyl or alkenyl esters of (meth)acrylic acid; and from 0 to 40% by weight, preferably from 0 to 30% by weight, of nonionic monoethylenically unsaturated monomers selected from styrene and substituted styrene or vinyl monomers described above, based on the solids weight of the acrylic (co)polymer.

In another preferred embodiment, the acrylic (co)polymer comprises, as polymerized units, from 15% to 85% by weight, preferably from 20% to 80% by weight, and more preferably from 30% to 50% by weight, of nonionic monoethylenically unsaturated monomers selected from styrene, substituted styrene, or vinyl monomers, such as styrene and vinyl acetate; and from 15% to 85% by weight, preferably from 20% to 80% by weight, and more preferably from 70% to 50% by weight, of nonionic monoethylenically unsaturated monomers selected from one or more (meth) alkyl or alkenyl esters of (meth)acrylic acids, such as butyl acetate, based on the solids weight of the acrylic (co)polymer.

The types and levels of the monomers described above, as polymerized units, may be chosen to provide the acrylic (co)polymer with a glass transition temperature ($T_g$) suitable for different applications. The $T_g$ of the acrylic (co)polymer may be in the range of from −10° C. to 30° C., from −5° C. to 25° C., or from 0° C. to 20° C. $T_g$ values used herein are those calculated by using the Fox equation (T. G. Fox, Bull. Am. Physics Soc., Volume 1, Issue No. 3, page 123 (1956)). For example, for calculating the $T_g$ of a copolymer of monomers $M_1$ and $M_2$, $$\frac{1}{T_g(calc.)} = \frac{w(M_1)}{T_g(M_1)} + \frac{w(M_2)}{T_g(M_2)},$$

wherein $T_g$(calc.) is the glass transition temperature calculated for the copolymer, $w(M_1)$ is the weight fraction of monomer $M_1$ in the copolymer, $w(M_2)$ is the weight fraction of monomer $M_2$ in the copolymer, $T_g(M_1)$ is the glass transition temperature of the homopolymer of $M_1$, and $T_g(M_2)$ is the glass transition temperature of the homopolymer of $M_2$, all temperatures being in K. The glass transition temperatures of monomers may be found, for example, in "Polymer Handbook", edited by J. Brandrup and E. H. Immergut, Interscience Publishers.

In one embodiment, the acrylic (co)polymer dispersion useful in the present invention comprises water-soluble nonionic cellulose ethers as stabilizers. Suitable water-soluble nonionic cellulose ethers may include, for example, hydroxyethyl cellulose, hydroxypropyl cellulose, methyl cellulose, hydroxypropyl methyl cellulose, ethyl hydroxyethyl cellulose, methyl hydroxyethyl cellulose, or mixtures thereof. In one embodiment, hydroxyethyl cellulose is used as the stabilizer. The amount of the water-soluble nonionic cellulose ether in the dispersion may be, based on the solids weight of the acrylic (co)polymer, 0.1% by weight or more, 0.5% by weight or more, or even 0.8% by weight or more, and at the same time, 2% by weight or less, 1.5% by weight or less, or even 1.0% by weight or less.

The aqueous dispersion of the acrylic (co)polymers useful in the present invention may be prepared by polymerization techniques well known in the art such as suspension polymerization or emulsion polymerization of the monomers described above. Emulsion polymerization is a preferred process, which is discussed in detail in D. C. Blackley, Emulsion Polymerization (Wiley, 1975), or, alternatively, it is also discussed in H. Warson, The Applications of Synthetic Resin Emulsions, Chapter 2 (Ernest Berm Ltd., London 1972). Emulsion polymerization techniques for preparing the aqueous dispersion of the acrylic (co)polymer particles are well known in the polymer art, and include multiple stage polymerization processes. For each monomer, the concentration of the monomer based on the total weight of monomers used in preparing the aqueous dispersion is substantially the same as the concentration of copolymerized such monomer based on the solids weight of the acrylic (co)polymer. The water-soluble nonionic cellulose ethers as the stabilizer may be first dissolved in water prior to mixing with other ingredients for emulsion polymerization. The emulsion polymerization may be conducted in the presence of a surfactant. These surfactants may include anionic and/or nonionic emulsifiers, for example, alkali metal or ammonium salts of alkyl, aryl, alkylaryl sulfates, or sulfonates; alkyl sulfonic acids; sulfosuccinate salts; fatty acids; ethylenically unsaturated surfactant monomers; and ethoxylated alcohols or phenols. The amount of the surfactant used is usually 0.1% to 6% by weight, based on the total weight of monomers. Preferably, nonionic surfactants are used. Temperature suitable for emulsion polymerization processes may be lower than 100° C., in the range of from 30° C. to 95° C., or in the range of from 50° C. and 90° C. A mixture of the monomers may be added neat or as an emulsion in water. The monomer mixture may be added in one or more additions or continuously, linearly or nonlinearly, over the reaction period, or combinations thereof. The surfactant may be added prior to or during the polymerization of the monomers, or combinations thereof. A portion of the surfactant can also be added after the polymerization.

In the emulsion polymerization process, free radical initiators may be used. Examples of suitable free radical initiators include hydrogen peroxide, sodium peroxide, potassium peroxide, t-butyl hydroperoxide, cumene hydroperoxide, ammonium and/or alkali metal persulfates, sodium perborate, perphosphoric acid, and salts thereof; potassium permanganate, and ammonium or alkali metal salts of peroxydisulfuric acid. The free radical initiators may be used typically at a level of 0.01 to 3.0% by weight, based on the total weight of monomers.

Redox systems comprising the above described initiators coupled with a suitable reductant may be used in the emulsion polymerization process. Examples of suitable reductants include sodium sulfoxylate formaldehyde, ascorbic acid, isoascorbic acid, alkali metal and ammonium salts of sulfur-containing acids, such as sodium sulfite, bisulfite, thiosulfate, hydrosulfite, sulfide, hydrosulfide or dithionite, formadinesulfinic acid, hydroxymethanesulfonic acid, acetone bisulfite, glycolic acid, glyoxylic acid hydrate, lactic acid, glyceric acid, malic acid, tartaric acid and salts of the preceding acids. Redox reaction catalyzing metal salts of iron, copper, manganese, silver, platinum, vanadium, nickel, chromium, palladium, or cobalt may be used. Chelating agents for the metals may optionally be used.

In the emulsion polymerization process, one or more chain transfer agents may also be used. Examples of suitable chain transfer agents include 3-mercaptopropionic acid, dodecyl mercaptan, methyl 3-mercaptopropionate, butyl 3-mercaptopropionate, benzenethiol, azelaic alkyl mercaptan, or mixtures thereof. When present, the chain transfer agent may be present, based on the total weight of monomers, in an amount of from 0.01% to 5% by weight, from 0.05% to 3% by weight, or from 0.1% to 2% by weight.

After the emulsion polymerization is completed, organic bases and/or inorganic bases as neutralizers may also be used. Suitable bases include ammonia, sodium hydroxide, potassium hydroxide, zinc oxide, mono-ethanolamine, tri-ethyl amine, diethyl amine, dimethyl amine, sodium borate, potassium borate, aluminum hydroxide, 2-amino-2-methyl-1-propanol, or combinations thereof. Preferably, 2-amino-2-methyl-1-propanol is used as the neutralizer.

The aqueous acrylic (co)polymer dispersion useful in the present invention may contain from 30% to 70% by weight of solids, from 35% to 60% by weight of solids, or from 40% to 50% by weight of solids, based on the total weight of the aqueous acrylic (co)polymer dispersion.

The aqueous acrylic (co)polymer dispersion useful in the present invention may be present, based on the total weight of the coating composition, in an amount of 60% by solids weight or more, 75% by solids weight or more, or even 80% by solids weight or more, and at the same time, 95% by solids weight or less, 90% by solids weight or less, or even 85% by solids weight or less.

The coating composition of the present invention further comprises a dispersion of core-shell polymeric particles, which particles comprise, when dry, one or more void. Such voided particles are often referred to in the art as "opaque polymer", which is commonly made by an emulsion polymerization process, as discussed in Blackley or Warson above. More specifically, opaque polymer is most commonly formed via an aqueous multistage emulsion polymerization to form a core-shell polymeric particle. The core of the core-shell polymeric particle includes, when dry, a core having at least one void capable of scattering visible light, i.e., capable of providing opacity to a composition in which it is included. One or more void in core-shell particles, when dry, is generated, for example, by complete or partial hydrolysis and dissolution of the core polymer, by swelling of the core polymer with acid, base or nonionic organic agents with restricted subsequent collapse of the particle, and the like. The core-shell particle is preferably formed by an aqueous multistage emulsion polymerization followed by swelling with a base. Such multistage processes are disclosed in U.S. Pat. Nos. 4,427,836; 4,468,498; 4,469,825; 4,594,363; 4,677,003; 4,910,229; 4,920,160; 4,970,241; 5,157,084; 5,494,971; 5,510,422; 6,139,961; 6,632,531; 6,896,905 and 8,470,910; as well as in European Patent Applications EP 267,726, EP 331,421 and EP 915,108.

In one embodiment, the core-shell polymeric particles are multistage polymers. The stages of the preferred multistage polymers include core stage polymer (the "core"), and shell stage polymer (the "shell"). The core and shell may each, independently, include more than one stage. There may also be one or more intermediate stages. An intermediate stage polymer, when present, partially or fully encapsulates the core and itself is partially or fully encapsulated by the shell. The intermediate stage may be prepared by conducting an emulsion polymerization in the presence of the core. The cores of the preferred multistage polymers are emulsion polymers and include, as polymerized units, from 5% to 100% by weight, from 20% to 60% by weight, or from 30% to 50% by weight, of at least one hydrophilic monoethylenically unsaturated monomer and from 0 to 95% by weight, of at least one nonionic monoethylenically unsaturated monomer; based on the weight of the core polymer. Cores containing at least 5% by weight, based on the total weight of the core polymer, of at least one hydrophilic monoethylenically unsaturated monomer will generally result in a suitable degree of swelling. The core polymer may be made in a single stage or step of the multistage polymerization or may be made by a plurality of steps in sequence.

Suitable hydrophilic monoethylenically unsaturated monomer useful for making the core polymer may include monoethylenically unsaturated monomers containing acid-functionality such as monomers containing at least one carboxylic acid group including, for example, acrylic acid; methacrylic acid; acryloxypropionic acid; (meth)acryloxypropionic acid; itaconic acid; aconitic acid; maleic acid or anhydride; fumaric acid; crotonic acid; monomethyl maleate; monomethyl fumarate; monobutyl fumarate; monomethyl itaconate and the like. Acrylic acid and methacrylic acid are preferred. Suitable nonionic monoethylenically unsaturated monomers for making the core polymer include those described above for use in the acrylic (co) polymer.

The core, whether obtained by a single stage process or a process involving several stages, may have an average particle size of from 50 nanometers (nm) to 1.0 micron or from 100 nm to 300 nm, diameter in unswollen condition. If the core is obtained from a preformed or seed polymer, the seed polymer preferably has an average particle size of from 30 nm to 200 nm. The core may also optionally contain from 0.1% to 20% by weight or from 0.1% to 10% by weight, based on the total weight of the core, of multiethylenically unsaturated monomer, wherein the amount used is generally approximately directly proportional to the amount of hydrophilic monoethylenically unsaturated monomer used. Alternatively, the core polymer may contain from 0.1% to 60% by weight, based on the total weight of the core polymer, of butadiene. Suitable multiethylenically unsaturated monomers include alkylene glycol diacrylates and dimethacrylates, such as for example, ethylene glycol di(meth)acrylate; 1,1,1-trimethylol propane di(meth)acrylate; pentaerythritol trimethacrylate; divinyl benzene; vinyl (meth)acrylate; allyl (meth)acrylate, and the like.

The monomers used, as polymerized units, in forming the shell of the multistage polymer, and the relative proportions thereof in the shell should be such that it is permeable to an aqueous or gaseous volatile or fixed basic swelling agent capable of swelling the core. In the event that multiple shells are utilized the composition of the shell is taken herein as the total composition of all of the shells. Styrene is a preferred monomer. In an alternative embodiment, the shell further comprises, based on the weight of the shell, multiethylenically unsaturated monomer. Suitable multiethylenically unsaturated monomers are those disclosed herein for optional use in the core polymer. The shell may include, as polymerized units, from 0% to 35%, from 0% to 10%, or from 0.1% to 10% by weight, based on the weight of the shell, of one or more monoethylenically unsaturated monomers containing acid-functionality such as those described above for use in the core polymer. (Meth)acrylic acid is preferred. Preferably, the proportion of acid-functional monoethylenically unsaturated monomer in the shell polymer does not exceed one-third the proportion thereof in the core polymer. The weight ratio of the core to an intermediate stage, if present, is typically in the range of from 1:0.5 to 1:10 or in the range of from 1:1 to 1:7. The weight ratio of core to shell is typically in the range of from 1:5 to 1:20 or in the range of from 1:8 to 1:15. The amount of the shell polymer is typically such as to provide an overall size of the multistage polymer particle of from 70 nm to 4.5 microns, from 100 nm to 3.5 microns, from 200 nm to 2.0 microns, or from 300 nm to 2000 nm, in unswollen condition (that is, before any neutralization to raise the pH to about 6 or higher) whether the shell polymer is formed in a single stage or in a plurality of stages. When the hydrophilic core polymer is fully encapsulated, it does not titrate with alkali metal bases under analytical conditions of 1 hour and at room temperature. The extent of encapsulation can be determined by removing samples during the course of the shell polymerization and titrating with sodium hydroxide.

The void of the core-shell latex polymeric particles is preferably produced by swelling the acid-containing core with an aqueous basic swellant that permeates the shell and expands the core. This expansion may involve partial merging of the outer periphery of the core into the pores of the inner periphery of the shell and also partial enlargement or bulging of the shell and the entire particle overall. When the swellant is removed by drying, the shrinkage of the core develops a microvoid, the extent of which depends on the resistance of the shell to restoration to its previous size. Suitable swelling agents for the core include, for example, ammonia, ammonium hydroxide, alkali metal hydroxides (such as sodium hydroxide), and volatile lower aliphatic amines (such as trimethylamine and triethylamine) The swelling step may occur during any of the multistage shell polymerization steps, between any of the staged polymerization steps, or at the end of the multistage polymerization process.

Commercially available core-shell polymeric particles which contain one or more void when dry may include, for example, ROPAQUE™ opaque polymers available from The Dow Chemical Company (ROPAQUE is a trademark of The Dow Chemical Company), CELOCOR™ opaque polymers from Arkema, HIQUE™ opaque polymers available from Hankuck Latices Co., Ltd., or mixtures thereof.

The amount of such core-shell polymeric particles in the coating composition may be, based on the total solids weight of the coating composition, 1% by solids weight or more, 2% by solids weight or more, 3% by solids weight or more, or even 5% by solids weight or more, and at the same time, 15% by solids weight or less, 12% by solids weight or less, 10% by solids weight or less, or even 8% by solids weight or less.

The coating composition of the present invention further comprises one or more amphoteric surfactants (that is, amphiphilic surfactants) Amphoteric surfactants bear both acidic and basic functionality and are well known in the art, for example, Amphoteric Surfactants, ed. B. R. Bluestein and C. L. Hilton, Surfactant Series Vol. 12 Marcel Dekker NY, N.Y. (1982). The amphoteric surfactants useful in the present invention may include those having an isoelectric point at pH=3 to pH=8. The isoelectric point occurs at a characteristic pH for each amphoteric surfactant, and is that pH at which the negative charge on the surfactant molecule is exactly balanced by the positive charge on that same molecule.

The amphoteric surfactants useful in the present invention include those having weakly acidic functionality, especially carboxy functionality. The carboxy moieties may be present in fully protonated (carboxylic acid) form, as salts with at least one type of cation, and as mixtures of protonated and salt forms. The carboxylic acid moieties may also be part of inner salts. As used herein, inner salt refers to a molecule bearing an anionically charged moiety, the counter ion (i.e., cation) for which is also a moiety attached to the that same molecule.

Suitable amphoteric surfactants useful in the present invention include, for example, aminocarboxylic acids, amphoteric imidazoline derivatives, betaines, and macromolecular ampholytes Amphoteric surfactants from any of these classes may be further substituted with fluorocarbon substituents, siloxane substituents, or combinations thereof. Additional useful amphoteric surfactants can be found in Amphoteric Surfactants, ed. B. R. Bluestein and C. L. Hilton, Surfactant Series Vol. 12 Marcel Dekker NY, N.Y. (1982).

Aminocarboxylic acids useful as the amphoteric surfactants in the present invention may have carboxy moieties present in either protonated form or in carboxylate form. Where more than one carboxy group is present on a molecule, those carboxy groups may all be in protonated form, in carboxylate form, or they may be present as some mixture of protonated and carboxylate forms. Furthermore, the ratio of protonated to unprotonated carboxy moieties may vary from one molecule to another, otherwise identical, molecule in a given system. Cations present as counter ions for the carboxylate moieties include cations of lithium, sodium, potassium, amines (i.e., ammonium cations derived from protonation or other quaternary substitution of amines), zinc, zirconium, calcium, magnesium, and aluminum. Any of the aminocarboxylic acids may have amino moieties present in either protonated (ammonium) or free amine form (i.e., as deprotonated primary, secondary, or tertiary amine) Where more than one amino group is present on a molecule, those amino groups may all be in protonated form, in free amine form, or they may be present as some mixture of protonated and free amine forms. The ratio of protonated to unprotonated amine moieties may vary from one molecule to another, otherwise identical, molecule in a given system. Anions present as counter ions for the ammonium moieties include chloride, bromide, sulfate, carbonate, hydroxide, formate, acetate, propionate and other carboxylate anions.

Suitable aminocarboxylic acids useful as the amphoteric surfactants in the present invention include, for example, α-aminocarboxylic acids having the general structure of $R_1$—NH—$CH_2$COOH, where $R_1$=$C_4$-$C_{20}$ linear or branched, alkyl, alkenyl, or fluoro or silicone functional hydrophobe group; and β-aminocarboxylic acids having the general structure of $R_1$—NH—$CH_2CH_2$COOH and $R_1$N$(CH_2CH_2COOH)_2$; where $R_1$ is as described above for α-aminocarboxylic acids. β-aminocarboxylic acids are available from Henkel Corporation, King of Prussia, Pa., under the name DERIPHAT™. Unless otherwise stated, the DERIPHAT ampholytes have the general formula $R_2$—NHCH$_2$CH$_2$COOH, where $R_2$=residue of coconut fatty acids, residue of tallow fatty acids, lauric acid, myristic acid, oleic acid, palmitic acid, stearic acid, linoleic acid, other $C_4$-$C_{20}$ linear or branched, alkyl, alkenyl, and mixtures thereof. Examples of suitable aminocarboxylic acids useful in the present invention include sodium-N-coco-β-aminopropionate; N-coco-β-aminopropionic acid; N-lauryl/myristyl-(3-aminopropionic acid; disodium-N-tallow-β-iminodipropionate, $R_2$N($CH_2CH_2$COONa)$_2$; disodium-N-lauryl-β-iminodipropionate; and partial sodium salt of N-lauryl-β-iminodipropionic acid, and $R_2$N($CH_2CH_2$COOH)($CH_2CH_2$COONa). Useful polyaminocarboxylic acids include $R_3$C(=O)NHC$_2$H$_4$(NHC$_2$H$_4$)$_x$HCH$_2$COOH and $R_3$-substituted ethylenediaminetetraacetic acid (EDTA), where $R_3$=$C_4$-$C_{20}$ linear or branched, alkyl or alkenyl, and x=0-3.

Amphoteric imidazoline derivatives useful as the amphoteric surfactants in the present invention may include those derived from variously substituted 2-alkyl-2-imidazolines and 2-alkenyl-2-imidazolines which have nitrogen atoms at the 1 and 3 positions of the five-membered ring and a double bond in the 2,3 position. The alkyl or alkenyl group may be a $C_4$-$C_{20}$ linear or branched chain. The amphoteric imidazoline derivatives are produced via reactions in which the imidazoline ring opens hydrolytically under conditions allowing further reaction with such alkylating agents as sodium chloroacetate, methyl (meth)acrylate, ethyl (meth)acrylate, and (meth)acrylic acid. Examples of suitable amphoteric surfactants derived from the reaction of 1-(2-hydroxyethyl)-2-($R_4$)-2-imidazolines with acrylic acid or acrylic acid esters, where $R_4$=residue of coconut fatty acids, include cocoamphocarboxypropionic acid; $R_4$—C(=O)NHCH$_2$CH$_2$N(CH$_2$CH$_2$OH)(CH$_2$CH$_2$COONa); cocoamphopropionate; $R_4$—C(=O)NHCH$_2$CH$_2$N(CH$_2$CH$_2$COOH)(CH$_2$CH$_2$OCH$_2$CH$_2$COOH); $R_4$—C(=O)NHCH$_2$CH$_2$N(CH$_2$CH$_2$COONa)(CH$_2$CH$_2$OCH$_2$CH$_2$COONa); cocoamphoglycinate, $R_4$—C(=O)NHCH$_2$CH$_2$N(CH$_2$CH$_2$OH)(CH$_2$COONa); cocoamphocarboxypropionate; coamphocarboxyglycinate; and [$R_4$—C(=O)NHCH$_2$CH$_2$N$^+$(CH$_2$CH$_2$OH)(CH$_2$COONa)$_2$]OH.

Betaines useful as the amphoteric surfactants in the present invention refer to surface-active inner salts containing at least one quaternary ammonium cation and at least one carboxy anion. The nomenclature for betaines derives from the single compound (trimethylammonio)acetate which is called betaine and exists as an inner salt. Suitable betaines useful as the amphoteric surfactants in the present invention include, for example, compounds of the general formulae: $R_5$CONHCH$_2$CH$_2$CH$_2$N$^+$(CHs)$_2$CH$_2$COO$^-$; $R_5$—O—CH$_2$—N$^+$(CH$_3$)$_2$CH$_2$COO$^-$; and $R_5$N$^+$(CH$_3$)$_2$CH$_2$COO$^-$; where $R_5$=$C_4$-$C_{20}$ linear or branched, alkyl, alkenyl, or fluoro or silicone functional hydrophobe group. Specific examples of betaines include N-dodecyl-N,N-dimethylglycine and cocamidopropyl betaine, MONATERIC™ CAB, and MIRANOL™ CM-SF available from Solvay Chemicals.

Typically, when fluorocarbon substituents are attached to the amphoteric surfactants described above, those substituents are perfluoroalky groups, branched or unbranched, having 6 to 18 carbon atoms. However, these substituents may instead be partially fluorinated. They may also bear aryl functionality. Examples of suitable fluorocarbon amphoteric surfactants include fluorinated alkyl FLUORAD™ FC100 available from 3M and fluorinated alkyl ZONYL™ FSK available from DuPont.

Typical siloxane functional amphoteric surfactants may have the structures:

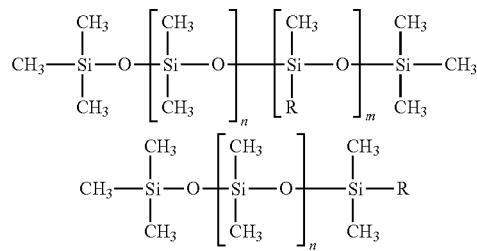

wherein R represents an amphoteric moiety and wherein n=3 to 50 and m+n=3 to 50. An example is the polyalkyl betaine polysiloxane copolymer ABIL™ B9950 available from Goldschmidt Chemical Corporation.

Macromolecular amphoteric surfactants useful in the present invention may include, for example, proteins, protein hydrolysates, derivatives of protein hydrolysates, starch derivatives, and synthetic amphoteric oligomers and polymers, such as those described in Chapter 5 of Amphoteric Surfactants, ed. B. R. Bluestein and C. L. Hilton, Surfactant Series Vol. 12 Marcel Dekker, N.Y., 1982. Of particular utility are those macromolecular ampholytes bearing carboxy functionality.

The amphoteric surfactant in the coating composition of the present invention may be present, based on the solids weight of the acrylic (co)polymer, in an amount of from 0.1% to 6.0% by weight, from 0.25% to 5.0% by weight, or from 0.5% to 4.0% by weight.

The coating composition of the present invention further comprises a light absorber, a light stabilizer, or mixtures thereof; and preferably an ultraviolet (UV) light absorber or a UV light stabilizer. The light absorber and the light stabilizer may be selected from hindered amines; benzophenones; triazines; oxanilides; benzotriazoles, specifically hydroxyphenyl benzotriazoles compounds, a number of which are available from BASF under the trademark "TINUVIN"; or mixtures thereof. A typical example of benzotriazoles is 2-(2'-hydroxy-5'-methylphenyl) benzotriazoles, preferably TINUVIN 1130. Examples of suitable UV light stabilizers include Bis-(1-octyloxy-2,2,6,6-tetramethyl-4-piperidinyl) sebacate (such as TINUVIN 123) and 2,4-bis[N-Butyl-N-(1-cyclohexyloxy-2,2,6,6-tetramethylpiperidin-4-yl)amino]-6-(2-hydroxyethylamine)-1,3,5-triazine (such as TINUVIN 152). The light absorber and the light stabilizer in the coating composition may be present, based on the total solids weight of the coating composition, in a combined amount of from 0.1% to 10% by weight, from 0.2% to 5% by weight, or from 0.5% to 1.5% by weight.

The coating composition of the present invention may further comprise one or more defoamers. "Defoamers" herein refers to chemical additives that reduce and hinder the formation of foam. Defoamers may be silicone-based defoamers, mineral oil-based defoamers, ethylene oxide/propylene oxide-based defoamers, alkyl polyacrylates, or mixtures thereof. Suitable commercially available defoamers include, for example, TEGO™ Airex 902 W and TEGO Foamex 1488 polyether siloxane copolymer emulsions both available from Evonik Industrials, BYK™-024 silicone deformer available from BYK, NOPCO™ NDW and NXZ mineral oil defoamers available from San Nopco, or mixtures thereof. The defoamer may be present, based on the total solids weight of the coating composition, in an amount of from 0 to 1% by weight, from 0.01% to 0.8% by weight, or from 0.1 to 0.5% by weight.

The coating composition of the present invention may further comprise one or more thickeners, also known as "rheology modifiers". The thickeners may include polyvinyl alcohol (PVA), clay materials, acid derivatives, acid copolymers, urethane associate thickeners (UAT), polyether urea polyurethanes (PEUPU), polyether polyurethanes (PEPU), or mixtures thereof. Examples of suitable thickeners include alkali swellable emulsions (ASE) such as sodium or ammonium neutralized acrylic acid polymers; hydrophobically modified alkali swellable emulsions (HASE) such as hydrophobically modified acrylic acid copolymers; associative thickeners such as hydrophobically modified ethoxylated urethanes (HEUR); and cellulosic thickeners such as methyl cellulose ethers, hydroxymethyl cellulose, hydroxyethyl cellulose, hydrophobically-modified hydroxy ethyl cellulose, sodium carboxymethyl cellulose, sodium carboxymethyl 2-hydroxyethyl cellulose, 2-hydroxypropyl methyl cellulose, 2-hydroxyethyl methyl cellulose, 2-hydroxybutyl methyl cellulose, 2-hydroxyethyl ethyl cellulose, and 2-hydoxypropyl cellulose. Preferably, the thickener is based on HEUR. The thickener may be present, based on the total solids weight of the coating composition, in an amount of from 0 to 3% by weight, from 0.1% to 2% by weight, or from 0.3% to 1% by weight.

The coating composition of the present invention may further comprise one or more coalescents. "Coalescents" herein refer to slow-evaporating solvents that fuse polymer particles into a continuous film under ambient condition. Examples of suitable coalescents include 2-n-butoxyethanol, dipropylene glycol n-butyl ether, propylene glycol n-butyl ether, dipropylene glycol methyl ether, propylene glycol methyl ether, propylene glycol n-propyl ether, diethylene glycol monobutyl ether, ethylene glycol monobutyl ether, ethylene glycol monohexyl ether, triethylene glycol monobutyl ether, dipropylene glycol n-propyl ether, n-butyl ether, or mixtures thereof. Preferred coalescents include dipropylene glycol n-butyl ether, ethylene glycol monobutyl ether, diethylene glycol monobutyl ether, n-butyl ether, or mixtures thereof. The coalescent may be present, based on the total solids weight of the coating composition, in an amount of from 0 to 10% by weight, from 0.1% to 9% by weight, or from 1% to 8% by weight.

The coating composition of the present invention may further comprise one or more neutralizers described above, which is used in an amount sufficient to adjust the pH value of the coating composition ranging from about 7 to 11 or from about 7 to 9.

The coating composition of the present invention may be free of, or further comprise inorganic fillers or additional organic fillers that are different from the core-shell polymer particles described above. These fillers may be present in the coating composition in an amount without compromising the peelability of coating films obtained therefrom. For example, the coating composition may comprise the inorganic fillers or additional organic fillers in a combined amount of from 0 to less than 5%, preferably less than 2% by weight, more preferably less than 1% by weight, and most preferably less than 0.5% by weight, based on the total solids weight of the coating composition. Examples of such inorganic fillers and additional organic fillers include silica sol, polyethylene (PE) wax such as ULTRALUBE™ E-340 PE wax emulsion available from The Keim-Additive Co., CERAFLOUR™ 929 micronized PE wax available from BYK Additives and Instruments, DEUTERON™ MK polyurea matting agent available from Deuteron Co., or mixtures thereof.

In addition to the components described above, the coating composition of the present invention may further comprise any one or combination of the following additives: buffers, dispersants, humectants, mildewcides, biocides, anti-skinning agents, colorants, flowing agents, anti-oxidants, plasticizers, leveling agents, and grind vehicles. These additives may be present in a combined amount of from 0 to 5% by weight or from 0.01% to 2% by weight, based on the total solids weight of the coating composition.

The coating composition of the present invention may be prepared with techniques known in the coating art. The process of preparing the aqueous coating composition of the present invention may comprise by admixing the aqueous dispersion of acrylic (co)polymers, the amphoteric surfactant, the dispersion of core-shell polymeric particles, the light absorber and/or light stabilizer. Other optional components may also be added as described above. Components in the aqueous coating composition may be mixed in any order to provide the aqueous coating composition of the present invention. Any of the above-mentioned optional components may also be added to the composition during or prior to the mixing to form the aqueous coating composition.

The coating composition of the present invention provides the coating obtained therefrom, i.e., the coating film after drying the coating composition applied to a substrate, with good peelability. The coating composition of the present invention provides the coating, before and even after QUV exposure, with a peelability level of 4 or higher, or even 5 according to the peel test described in the Examples section below. In one embodiment, the coating composition of the present invention has a peel strength less than 2 Newton/inch (N/in), preferably less than 1 N/in, when applied to a metal surface or a painted metal surface. The term "painted metal surface" means that the metal surface is coated by solvent borne coatings, such as solvent borne epoxy coatings and two-component polyurethane coatings, or aqueous acrylic coatings. The peel strength may be measured according to the FINAT test method described in the Examples section below. In addition, high tensile strength of the coating is also desirable so that the coating has sufficient durability during its service life. In one embodiment, the coating composition provides the coating with a tensile strength of at least 8 MPa, at least 12 MPa, or at least 13 MPa, according to the JG/T172-2005 method. A method of preparing a peelable coating may comprise forming the coating composition of the present invention, applying the coating composition to a substrate, and drying or allowing to dry, the applied coating composition to form the peelable coating.

A process of using the coating composition of the present invention may comprise the following: applying the coating composition to a substrate, and drying or allowing to dry the applied coating composition. The coating composition of the present invention can be applied to a substrate by incumbent means including brushing, dipping, rolling and spraying. The coating composition is preferably applied by spraying. The standard spray techniques and equipment for spraying such as air-atomized spray, air spray, airless spray, high volume low pressure spray, and electrostatic spray such as electrostatic bell application, and either manual or automatic methods can be used. After the coating composition of the present invention has been applied to a substrate, the coating composition may be dried, or be allowed to dry, at room temperature (20-25° C.), or at an elevated temperature, for example, from 35° C. to 60° C. to form a peelable film (this is, peelable coating).

The aqueous coating composition of the present invention can be applied to, and adhered to, various substrates. Examples of suitable substrates include wood, metals, plastics, foams, stones, elastomeric substrates, glass, fabrics, concrete, cementious substrates, or pre-coated substrates. The coating composition is suitable for various coating applications, such as marine and protective coatings, automotive coatings, wood coatings, general metal coatings, coil coatings, roof coatings, plastic coatings, powder coatings, can coatings, and civil engineering coatings. The coating composition of the present invention is particularly suitable for ship coatings. The aqueous coating composition can be used alone, or in combination with other coatings to form multi-layer coatings.

EXAMPLES

Some embodiments of the invention will now be described in the following Examples, wherein all parts and percentages are by weight unless otherwise specified. The following materials are used in the examples:

ROPAQUE Ultra E opaque hollow sphere polymeric pigment ("Ultra E"), available from The Dow Chemical Company, comprises polymeric particles with core shell structure and used as an organic filler.

EVERSORB™ AQ1 ("AQ1"), available from Everlight Chemical, is a mixture of benzotriazol and a hindered amine light stabilizer (HALS).

EVERSORB AQ3 ("AQ3"), available from Everlight Chemical, is a modified benzotriazol and used as a UV absorber.

EVERSORB AQ4 ("AQ4"), available from Everlight Chemical, is a HALS.

MIRATAINE™ CAB ("CAB"), available from Solvay Chemicals, is cocamidopropyl betaine and used as an amphiphilic surfactant.

TEXANOL™ ester alcohol, available from Eastman Chemical Company, is 2,2,4-Trimethyl-1,3-pentanediol monoisobutyrate and used as a coalescent.

NOPCO™ NDW, available from The San Nopco, is a mineral oil and used as a defoamer.

ANGUS™ AMP-95 ("AMP-95"), available from The Dow Chemical Company, is 2-amino-2-methyl-1-propanol and used as a neutralizer (ANGUS is a trademark of The Dow Chemical Company).

ACRYSOL™ TT615, available from The Dow Chemical Company, is a hydrophobically modified alkali swellable emulsion and used as a rheology modifier (ACRYSOL is a trademark of The Dow Chemical Company).

KATHON™ LX-150, available from The Dow Chemical Company, is an isothiazolone and used as a biocide (KATHON is a trademark of The Dow Chemical Company).

DISPONIL™ SLS ("SLS"), available from BASF Chemicals, is sodium lauryl sulfate and used as an alkyl phenyl ethoxylate (APEO) free surfactant.

RHODAFAC™ RS-610 phosphate salt, available from The Solvay Chemicals, is a polyoxyethylene tridecyl ether phosphate salt and is used as a surfactant.

TRITON™ X-405 ("X-405"), available from The Dow Chemical Company, is polyethylene glycol octylphenyl ether and used as a surfactant (TRITON is a trademark of The Dow Chemical Company).

DEUTERON™ MK polyurea matting agent ("MK") is available from Deuteron Co. and used as an organic filler.

BINDZIL™ 2040, available from Akzo Nobel Company, is a silica dioxide emulsion and used as an inorganic filler.

CERAFLOUR™ 929, available from BYK Additives and Instruments, is a micronized modified polyethylene (PE) wax and used as an organic filler.

SILQUEST™ A-171 ("A-171"), available from GE Toshiba Silicones, is vinyltrimethoxysilane and used as a crosslinker.

Ti-PURE™ R-706, available from DuPont, is a surface modified titanium dioxide powder and used as an inorganic filler.

The following standard analytical equipment and methods are used in the Examples.

Peel Test

The peel test is used for determining the ease of removal, or peelability, of films formed from coating compositions. Coating compositions are sprayed onto solvent-borne epoxy pre-coated panels to form a wet film with a thickness of about 300-400 μm. After 30 minutes (min) flash dry, the panels are placed into an oven at 80° C. for about 2 hours. The obtained panels have a dry film thickness of about 100-150 μm.

Some of the above obtained panels are directly tested to determine the peelability of the films (that is, peelability before QUV exposure). Other panels obtained above are further placed into the QUV chamber of a QUV accelerated weathering tester (Model: QUV/SPRAY-67 manufactured by Q-Lab Co.) for two-week exposure. Then, the panels after QUV exposure are taken out and cooled to room temperature in 24 hours, and then are tested to determine the peelability after QUV exposure. The peelability properties of films before and after QUV exposure are determined as follows, The films are hand peeled from the panels (panels before QUV and panels after QUV, respectively) and rated on a scale of 1 to 5 for ease of removal (that is, peelability):

Rating 1 means the film is very difficult to be removed by hand and tends to break into pieces during the removal process if removed with the aid of tools;

Rating 2 means the film is difficult to be hand peeled off and tends to break into pieces instead of peeling away as a continuous sheet;

Rating 3 means the film can be hand peeled off with much effort while leaving more than 20% area residual pieces on the panel;

Rating 4 means the film can be hand peeled off with little effort and comes off as a continuous sheet or leaving less than 5% area residual pieces; and Rating 5 means the film comes off almost effortlessly as a continuous sheet (i.e. the film does not break) while leaving no residue.

Tensile Test

Coating compositions are applied onto a plastic paper using an applicator and a wet film of 400 μm thickness is formed. The wet film is dried for 14 days under constant temperature and humidity conditions (25° C., 50% RH). The tensile strength of the obtained dry films (thickness: 150±50 μm) is measured using Universal Testing Machine (AI-7000M, Gotech Testing Machines Co., Ltd.) according to the JG/T 172-2005 method (China). Films with a tensile strength of at least 8 MPa are desirable.

Peel Strength Test

The peel strength (180°) is measured using a Universal Mechanical Tester Instron Model 5943 in accordance with FINAT Test Method no. 1, FINAT Technical Handbook 7th edition, 2005 (jaw separation rate: 300 mm per minute with an accuracy of ±2%, test temperature: 23±2° C.).

Metal plates and solvent-borne epoxy pre-coated metal plates are first thoroughly cleaned. Coating compositions are applied to the metal test plates or pre-coated metal plates, respectively, and dry at room temperature for 7 days. Then coating strips, 25 mm width and a minimum length of 175 mm in the machine direction, are obtained (dry coating films thickness: about 150±50 μm). Coating strips are then tested by peeling the coating films through an angle of 180°. At least three coating strips are measured for each sample and the average value of peel strength is reported.

Preparation of Acrylic Latex Binder I

Preparation of Monomer Mixture: ECOSURF™ SA-9 surfactant (26.28 grams (g), 99.97% by weight of solids) comprising ethoxylated propoxylated alcohols, available from The Dow Chemical Company (ECOSURF is a trademark of The Dow Chemical Company), was added into a monomer tank with stirring. Then vinyl acetate (VA) (1532.88 g) and butyl acrylate (BA) (270.00 g) were slowly added into the resulting surfactant solution to obtain the monomer mixture.

A solution containing TERGITOL™ 15-S-40 surfactant (91.44 g, 70.0% by weight of solids), a secondary alcohol ethoxylate available from The Dow Chemical Company (TERGITOL is a trademark of The Dow Chemical Company), hydroxyethyl cellulose (HEC) (15.84 g) and deionized (DI) water (253.08 g) was added into a 4-neck, 5 liter round bottom flask equipped with a thermocouple, a cooling condenser and an agitator. This solution was heated to 85° C. under nitrogen atmosphere. When all HEC was dissolved, NOPCO NDW (99.8%, 2.16 g) was added into the flask. An aqueous ferrous sulphate solution (0.01 g ferrous sulphate in 3.24 g DI water) as a promoter was added into the flask. An aqueous sodium persulfate (SPS) solution (0.95 g SPS in 28.08 g DI water) as an initial catalyst was further added into the flask. The monomer mixture obtained above was then directly fed into the flask within 220 min. The temperature was maintained at 75-77° C. Then an aqueous SPS catalyst solution (0.95 g SPS in 170 g DI water) and an aqueous buffer solution of sodium acetate (5.00 g) and acetic acid (2.45 g) in 170.0 g DI water were fed into the flask at a speed of 0.88 g/min over a period of 220 min Upon completing addition, the reaction mixture was held at 76° C. for 10 min, then t-butylhydroperoxide (t-BHP) (0.24 g t-BHP in 12.56 g DI water) as a first chaser catalyst and sodium bisulfate (SBS) (0.15 g SBS in 5.75 g DI water) as a first chaser activator were added as shot while cooling, and then held for about 20 min above 70° C. Then a second chaser catalyst (2.3 g t-BHP in 8.2 g DI water) and a second chaser activator (1.65 g SBS in 8.2 g DI water) were fed at a speed of 0.3 g/min. The resultant mixture was cooled down to room temperature to obtain the Acrylic Latex Binder I (calculated $T_g$: 20° C., particle size: about 380 nm, solids: 55.0%).

Preparation of Acrylic Latex Binder II

The Acrylic Latex Binder II was prepared according to the same procedure as described above for preparing the Acrylic Latex Binder I, except that the monomer mixture was prepared as follows:

Preparation of Monomer Mixture: ECOSURF SA-9 surfactant (26.28 g, 99.97% by weight of solids) was added into 450.5 g DI water in monomer tank with stirring. Then VA (1000.88 g), BA (780.00 g), acrylic acid (AA) (30.1 g) and A-171 (15.8 g) were slowly added into the resulting surfactant solution to obtain the monomer mixture.

The obtained Acrylic Latex Binder II has the following properties: calculated $T_g$: 10° C., particle size: 280 nm, and solids: 55%.

Preparation of Acrylic Latex Binder III

The Acrylic Latex Binder III was prepared according to the same procedure as described above for preparing the Acrylic Latex Binder I, except that the monomer mixture was prepared as follows:

Preparation of Monomer Mixture: ECOSURF SA-9 surfactant (26.28 g, 99.97% by weight of solids) was added into 450.5 g DI water in monomer tank with stirring. Then styrene (ST) (885.88 g) and BA (880.00 g) were slowly added into the resulting surfactant solution to obtain the monomer mixture.

The obtained Acrylic Latex Binder III has the following properties: calculated $T_g$: 22° C., particle size: 380 nm, and solids: 55%.

Preparation of Acrylic Latex Binder IV

The Acrylic Latex Binder IV was prepared according to the same procedure as described above for preparing the Acrylic Latex Binder I, except that the monomer mixture was prepared as follows:

Preparation of Monomer Mixture: ECOSURF SA-9 surfactant (26.28 g, 99.97% by weight of solids) was added into 450.5 g DI water in monomer tank with stirring. Then methyl methacrylate (MMA) (885.88 g) and BA (880.00 g) were slowly added into the resulting surfactant solution to obtain the monomer mixture.

The obtained Acrylic Latex Binder IV has the following properties: calculated $T_g$: 22° C., particle size: 380 nm, and solids: 55%.

Example (Ex) 1

AMP-95 was added into the Acrylic Latex Binder I obtained above to neutralize the binder to a pH value of about 7-9. Ultra E (10.0 g 30% by weight of solids) was added into the binder over 30 min under agitation using a high speed disperser at a speed ranging from 400~800 rpm. TEXANOL coalescent (2.0 g, 100% by weight of solids) was then added over 20 min. A mixture of CAB surfactant (2.0 g, 35% by weight of solids) and AQ1 light absorber (1.0 g, 90% by weight of solids) was further fed over 30 min. Then ACRYSOL TT-615 rheology modifier (0.8 g, 30% by weight of solids) was added over 20 min. Finally, KATHON LX-150 biocide (0.50 g, 1.4% by weight of solids) and NOPCO NDW defoamer (0.50 g, 20% by weight of solids) were added to obtain the coating composition.

Exs 2-8 and Comparative (Comp) Exs A-K

Coating compositions of Exs 2-8 and Comp Exs A-I were prepared according to the same procedure as described above in Ex 1, based on formulations given in Tables 1-3.

Coating compositions of Comp Exs J and K were prepared according to the same procedure as described above in Ex 1, except that pigments were dispersed by OROTAN™ CA-2500 polyacid dispersant available from The Dow Chemical Company (OROTAN is a trademark of The Dow Chemical Company) prior to mixing with other components to form the coating compositions.

The obtained coating compositions were evaluated according to the test methods described above. Properties of the obtained coating films are shown in Tables 1-3.

As shown in Table 1, Comp Exs A, C and D did not achieve the required peelability after QUV exposure. Binder II for the coating composition of Comp Ex B comprising polymerized units of acid monomers also provided coatings with poor peelability after QUV exposure.

As shown in Table 2, coating compositions comprising SLS, RS-610 or X-405 surfactant provided coatings with unsatisfactory peelability before and after QUV exposure (Comp Exs E-G). Coating compositions comprising organic fillers such as PE wax and polyurea powder (Comp Exs H and I) also provided coatings with unsatisfactory peelability before and after QUV exposure. Coatings prepared from coating compositions comprising inorganic fillers such as silica sol and TiO$_2$ both showed poor peelability after QUV exposure (Comp Exs J and K).

As shown in Table 3, coating compositions of Exs 1-8 all demonstrated satisfactory peelability before and even after QUV exposure and the desired tensile strength. In addition, the peel strength of the coating composition of Ex 1 was evaluated according to the test method described above. The coating composition of Ex 1 demonstrated a peel strength less than 1 N/in, when applied to a metal plate or a pre-coated metal plate.

TABLE 1

|  | Com Ex A | Com Ex B | Com Ex C | Com Ex D |
|---|---|---|---|---|
| Binder, g/type | 95.0/Binder I | 85.0/Binder II | 85.0/Binder I | 85.0/Binder I |
| AMP-95, g | 0.7 | 0.7 | 0.7 | 0.7 |
| Ultra E, g | 0 | 10.0 | 0 | 20.0 |
| CAB, g | 2.0 | 2.0 | 0 | 2.0 |
| HALS, g | 1.0 | 1.0 | 5.0 | 1 |
| Coalescent, g | 2.0 | 2.0 | 2.0 | 2.0 |
| Rheology modifier, g | 0.8 | 0.8 | 0.8 | 0.8 |
| Biocide, g | 0.5 | 0.5 | 0.5 | 0.5 |
| Defoamer, g | 0.5 | 0.5 | 0.5 | 0.5 |
| Peelability | 5 | 4 | 4 | 4 |
| Peelability after QUV | 3 | 2 | 3 | 3 |
| Tensile strength, MPa | 12 | 13 | 12 | 11 |

TABLE 2

|  | Com Ex E | Com Ex F | Com Ex G | Com Ex H | Com Ex I | Com Ex J | Com Ex K |
|---|---|---|---|---|---|---|---|
| Binder, g/type | 85.0/Binder I | 85.0/Binder I | 85.0/Binder I | 85.0/Binder I | 85.0/Binder I | 85.0/Binder I | 85.0/Binder I |
| AMP-95, g | 0.7 | 0.7 | 0.7 | 0.7 | 0.7 | 0.7 | 0.7 |
| Filler, g/type | 10.0/Ultra E | 10.0/Ultra E | 10.0/Ultra E | 10.0/CERAFLOUR 929 | 10.0/MK | 10.0/BINDZIL 2040 | 10.0/R-706 |
| Surfactant, g/type | 2.0/SLS | 2.0/RS-610 | 2.0/X-405 | 2.0/CAB | 2.0/CAB | 2.0/CAB | 2.0/CAB |
| HALS, g | 0.8 | 0.8 | 0.8 | 1 | 1 | 1 | 1 |
| Coalescent, g | 2.0 | 2.0 | 2.0 | 2.0 | 2.0 | 2.0 | 2.0 |
| Rheology modifier, g | 0.8 | 0.8 | 0.8 | 0.8 | 0.8 | 0.8 | 0.5 |
| Biocide, g | 0.5 | 0.5 | 0.5 | 0.5 | 0.5 | 0.5 | 0.5 |
| Defoamer, g | 0.5 | 0.5 | 0.5 | 0.5 | 0.5 | 0.5 | 0.5 |
| Peelability | 2 | 3 | 3 | 3 | 3 | 4 | 4 |
| Peelability after QUV | 3 | 2 | 3 | 2 | 2 | 2 | 2 |
| Tensile strength, MPa | N/A | N/A | N/A | 8 | 8 | 7 | 6 |

TABLE 3

|  | Ex 1 | Ex 2 | Ex 3 | Ex 4 | Ex 5 | Ex 6 | Ex 7 | Ex 8 |
|---|---|---|---|---|---|---|---|---|
| Binder, g/type | 85/Binder I | 85/Binder I | 80/Binder I | 85/Binder III | 85/Binder IV | 85/Binder I | 90/Binder I | 85/Binder I |
| AMP-95, g | 0.7 | 0.7 | 0.7 | 0.7 | 0.7 | 0.7 | 0.7 | 0.7 |
| Ultra E, g | 10 | 5 | 15 | 10 | 10 | 15 | 5 | 10 |
| CAB, g | 2 | 2 | 3 | 2 | 2 | 1 | 1.5 | 5 |
| Light absorber/stabilizer, g | 1/AQ3 | 0.5/AQ3 | 2/AQ3 | 0.3/AQ1 | 1/AQ1 | 0.5/AQ4 | 1/AQ1 | 0.5/AQ1 |
| Coalescent, g | 2.0 | 2.0 | 2.0 | 2.0 | 2.0 | 2.0 | 2.0 | 2.0 |
| Rheology modifier, g | 0.8 | 0.8 | 0.8 | 0.8 | 0.8 | 0.8 | 0.8 | 0.8 |
| Biocide, g | 0.5 | 0.5 | 0.5 | 0.5 | 0.5 | 0.5 | 0.5 | 0.5 |
| Defoamer, g | 0.5 | 0.5 | 0.5 | 0.5 | 0.5 | 0.5 | 0.5 | 0.5 |
| Peelability | 5 | 5 | 5 | 5 | 5 | 5 | 5 | 5 |
| Peelability after QUV | 5 | 4 | 5 | 5 | 5 | 5 | 5 | 5 |

TABLE 3-continued

| | Ex 1 | Ex 2 | Ex 3 | Ex 4 | Ex 5 | Ex 6 | Ex 7 | Ex 8 |
|---|---|---|---|---|---|---|---|---|
| Tensile strength, MPa | 15 | 14 | 16 | 15 | 16 | 17 | 14 | 15 |

What is claimed is:

1. A peelable coating composition, comprising:
   (a) an aqueous dispersion of an acrylic (co)polymer, wherein the aqueous dispersion comprises a water-soluble nonionic cellulose ether stabilizer, and wherein the acrylic (co)polymer is substantially free of, as polymerized units, a monoethylenically unsaturated monomer containing acid-functionality;
   (b) an amphoteric surfactant having an isoelectric point at pH 3 to pH 8;
   (c) a dispersion of core-shell polymeric particles present in an amount of from 1% to 15% by solids weight, based on the total solids weight of the coating composition; wherein the polymeric particles comprise, when dry, at least one void; and
   (d) a light absorber, a light stabilizer, or mixtures thereof.

2. The coating composition of claim 1, wherein the core-shell polymeric particles are present in an amount of from 3% to 10% by solids weight, based on the total solids weight of the coating composition.

3. The coating composition of claim 1, wherein the amphoteric surfactant is a compound selected from an amino carboxylic acid; an amino carboxylic acid substituted with fluorocarbon substituents, siloxane substituents, or combinations thereof; an amphoteric imidazoline derivative; an amphoteric imidazoline derivative substituted with fluorocarbon substituents, siloxane substituents, or combinations thereof; betaine; betaine substituted with fluorocarbon substituents, siloxane substituents, or combinations thereof; or mixtures thereof.

4. The coating composition of claim 1, wherein the water-soluble nonionic cellulose ether is selected from hydroxyethyl cellulose, hydroxypropyl cellulose, methyl cellulose, hydroxypropyl methyl cellulose, ethyl hydroxyethyl cellulose, methyl hydroxyethyl cellulose, or mixtures thereof.

5. The coating composition of claim 1, wherein the concentration of the water-soluble nonionic cellulose ether stabilizer is present in the range of 0.1% to 2% by weight, based on the solids weight of the acrylic (co)polymer.

6. The coating composition of claim 1, wherein the acrylic (co)polymer has a Tg of from −10° C. to 30° C.

7. The coating composition of claim 1, wherein the aqueous dispersion of an acrylic (co)polymer is present in an amount of from 60% to 95% by solids weight, based on the total solids weight of the coating composition.

8. The coating composition of claim 1, wherein the light absorber or the light stabilizer is selected from hindered amines, benzotriazole, benzophenone, triazine, oxanilide, or mixtures thereof.

9. The coating composition of claim 1, wherein the coating composition comprises from 0.1% to 10% by weight, based on the total solids weight of the coating composition, of a light absorber, a light stabilizer, or mixtures thereof.

10. The coating composition of claim 1 further comprising a coalescent, a defoamer, a rheology modifier, or mixtures thereof.

11. The coating composition of claim 1, wherein the coating composition has a peel strength less than 2 N/in, when applied to a painted metal surface.

12. A peelable coating composition comprising:
   (a) an aqueous dispersion of an acrylic (co)polymer present in an amount of from 60% to 95% by solids weight, based on the total solids weight of the coating composition; wherein the dispersion comprises a water-soluble nonionic cellulose ether stabilizer, and wherein the acrylic (co)polymer is substantially free of polymerized units of a monoethylenically unsaturated monomer containing acid-functionality;
   (b) an amphoteric surfactant having an isoelectric point at pH 3 to pH 8;
   (c) a dispersion of core-shell polymeric particles present in an amount of from 1% to 15% by solids weight, based on the total solids weight of the coating composition; wherein the polymeric particles comprise, when dry, at least one void; and
   (d) from 0.1% to 10% by weight, based on the total solids weight of the coating composition, of a light absorber, a light stabilizer, or mixtures thereof.

13. A method of preparing a peelable coating, comprising:
   (1) applying to the surface of a substrate the peelable coating composition of claim 1, and
   (2) drying, or allowing to dry, the coating composition.

* * * * *